United States Patent [19]

Szwed

[11] Patent Number: 5,450,602

[45] Date of Patent: Sep. 12, 1995

[54] TWO STAGE REGISTER FOR CAPTURING ASYNCHRONOUS EVENTS AND SUBSEQUENTLY PROVIDING THEM TO A PROCESSOR WITHOUT LOSS OR DUPLICATION OF THE CAPTURED EVENTS

[75] Inventor: Peter K. Szwed, Saugerties, N.Y.

[73] Assignee: International Business Machines Corporation, Armonk, N.Y.

[21] Appl. No.: 985,980

[22] Filed: Dec. 4, 1992

[51] Int. Cl.$^6$ ................................ G06F 3/00
[52] U.S. Cl. ............................. 395/800; 395/550; 364/238.3; 364/239.6; 364/239.7; 364/271.6; 364/271.8; 364/DIG. 1
[58] Field of Search ............. 395/800, 200, 275, 550; 364/DIG. 1, DIG. 2, 238.3, 239.6, 239.7, 271.6, 271.8

[56] References Cited

U.S. PATENT DOCUMENTS

| | | | |
|---|---|---|---|
| 4,070,657 | 1/1978 | Fett | 365/233 |
| 4,176,400 | 11/1979 | Heckel | 364/900 |
| 4,394,774 | 7/1983 | Widergren et al. | 382/56 |
| 4,692,894 | 9/1987 | Bemis | 395/250 |
| 4,872,137 | 10/1989 | Jennings et al. | 395/800 |
| 5,220,673 | 6/1993 | Dalrymple et al. | 395/775 |

OTHER PUBLICATIONS

Morris, "Computer Engineering Hardware Design", 1988, pp. 103–109 and 246–251.

Voorhees, "Foolproof Event-Catching Register Circuit", *IBM Technical Disclosure Bulletin*, vol. 32, No. 5A, Oct. 1989, pp. 214–216.

Pennec et al., "Set/Reset System with Slow Set and Fast Reset", *IBM Technical Disclosure Bulletin*, vol. 32, No. 6B, Nov. 1989, pp. 217–218.

Primary Examiner—Alyssa H. Bowler
Assistant Examiner—Dzung C. Nguyen
Attorney, Agent, or Firm—Floyd A. Gonzalez

[57] ABSTRACT

An improved event catching read and reset register system responsive to event data signals from a data source and register select and register read and reset signals from a reading processor is provided. The system includes a generator for generating first and second control signals from the register select and register read signals. The read and reset register or registers simultaneously capture the event data and read out and reset the register in response to these control signals.

5 Claims, 3 Drawing Sheets

TWO STAGE REGISTER FOR CAPTURING ASYNCHRONOUS EVENTS AND SUBSEQUENTLY PROVIDING THEM TO A PROCESSOR WITHOUT LOSS OR DUPLICATION OF THE CAPTURED EVENTS

STATEMENT OF INVENTION

This invention relates to read and reset registers and more particularly to an improved method and means for operating the registers for simultaneous event capture and register clearing.

BACKGROUND OF THE INVENTION

In computing systems there is often a need for a "Read and Reset" type register. This is a storage facility that captures the occurrence of and holds events on its input. When the register is read out it is then reset back to a state indicating that the data event has not yet occurred. One usage of a read and reset register is in the detection of error states in a circuit. Here when an error state is entered, the read and reset register is set, and the error processing system is notified. The read and reset register will stay set until after the error processor has read out the value of the register. After the register is read, it is reset by circuitry which detects the action of the error processor reading the register. When the system causing the data events and the system reading the register are asynchronous to each other, a problem arises in the design of the read and reset register.

It is crucial that there does not exist a window of time between when the read and reset register is read out and when the register is reset. Such a window allows for lost data because if the event being captured occurs between the reading of the register and the clearing of the register, the register will not remain in a state indicating the event has occurred.

In *IBM Technical Disclosure Bulletin*, Vol. 32, No. 5A of October, 1989, pp. 214–216, entitled "Foolproof Event-Catching Register Circuit", of R. W. Voorhees, the window is prevented by relying on the register never being read and reset unless it has been already set.

In *IBM Technical Disclosure Bulletin*, Vol. 32, No. 6B of November, 1989, pp. 217–218, entitled "Set/Reset System With Slow Set and Fast Reset", of J. L. Le Pennec et al., the window is prevented from occurring by relying on the data event being much longer than the reset pulse. This occurs because often the clock frequencies for the data event and the reset pulse from the reading device differ greatly. This dependency makes this approach unsuitable for many applications.

It is also necessary that if the event occurs during the read action, the register should be set only for that read or only for the next read. Otherwise it would appear that the event occurred twice.

SUMMARY OF THE INVENTION

In accordance with one embodiment of the present invention an improved event catching read and reset register system is provided by generating control signals from register select and register read signals sent from a processor system reading the read and reset registers and logic means at each read and reset register responsive to said control signals for event catching and read out of the registers.

DESCRIPTION OF PREFERRED EMBODIMENT

Figure 1:
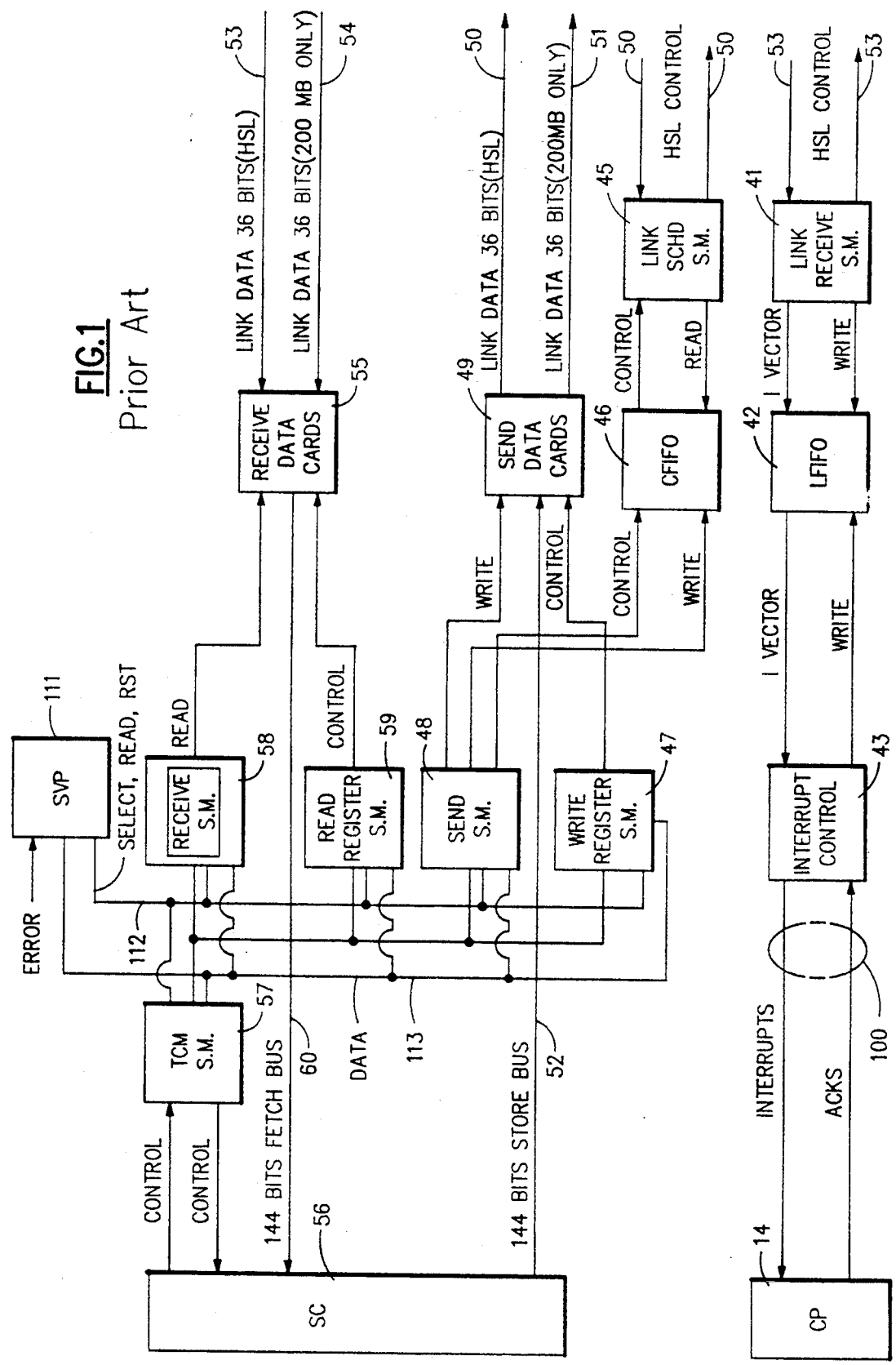
FIG. 1 is a prior art drawing of an adapter for a high speed link like that used for linking to a HIPPI link.

Referring to FIG. 1 there is illustrated an adapter and the input and outputs to the adapter used for coupling a high speed link 53 and 54 like the HIPPI (High Performance Parallel Interface) standard to a mainframe computer via the paging store 56 as disclosed in U.S. patent application Ser. No. 07/358,774 filed May 30, 1989 entitled "Computer System High Speed Link Method and Means" of R. C. Bono et al., incorporated herein by reference. A service processor 111 receives an error signal and generates the select signal that selects which one of the read and reset register sets to be monitored and also sends a read signal to the register sets in 47,48,57–59 over bus 112 to read what is on the selected register set. A common data bus 113 reads the captured data on the selected register set. Each of the register sets in 47,48,57–59 is made up of for example eight registers where each register captures one event bit.

Figure 2:
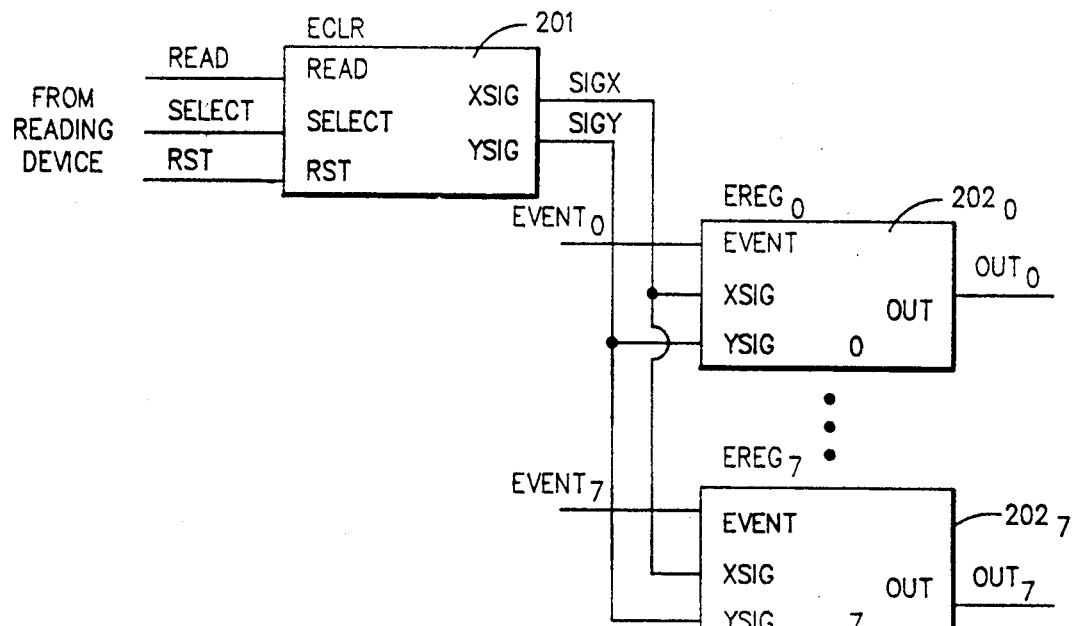
FIG. 2 is a block diagram of the read and reset register system according to one preferred embodiment of the present invention.
Figure 3:
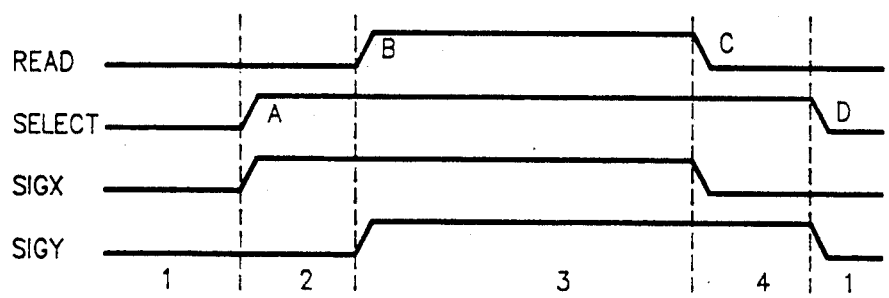
FIG. 3 is a timing diagram for the system of FIG. 2.

Referring to FIG. 2 a signal generator labeled ECLR 201 generates two output signals labeled SIGX and SIGY from the in/out READ and SELECT signals issued by the reading devices which in this case is the Service Processor 111. The timing sequence of these signals is shown in FIG. 3. This timing sequence is typical with microprocessors such as Intel's 80186. In this preferred embodiment the Supervisor Processor is an Intel 80186. At point A in FIG. 3 the register set is selected for reading. At point B, the read operation begins. At point C, the data is latched in by the reading device. At point D, the register or register set is no longer selected for reading. Using the sequence on the READ and SELECT, the ECLR 201 generates the signals SIGX and SIGY as shown in FIG. 3. The equations used in the ECLR are shown below:

$$SIGX = SELECT \,\&\, (\#SIGY + READ)$$

$$SIGY = (SELECT \,\&\, (SIGY + READ)) + RST$$

Where "&"=Logical AND, "+"=Logical OR , and "#" Logical Not. RST stands for reset which may be provided from the Supervisor Processor.

Figure 4:
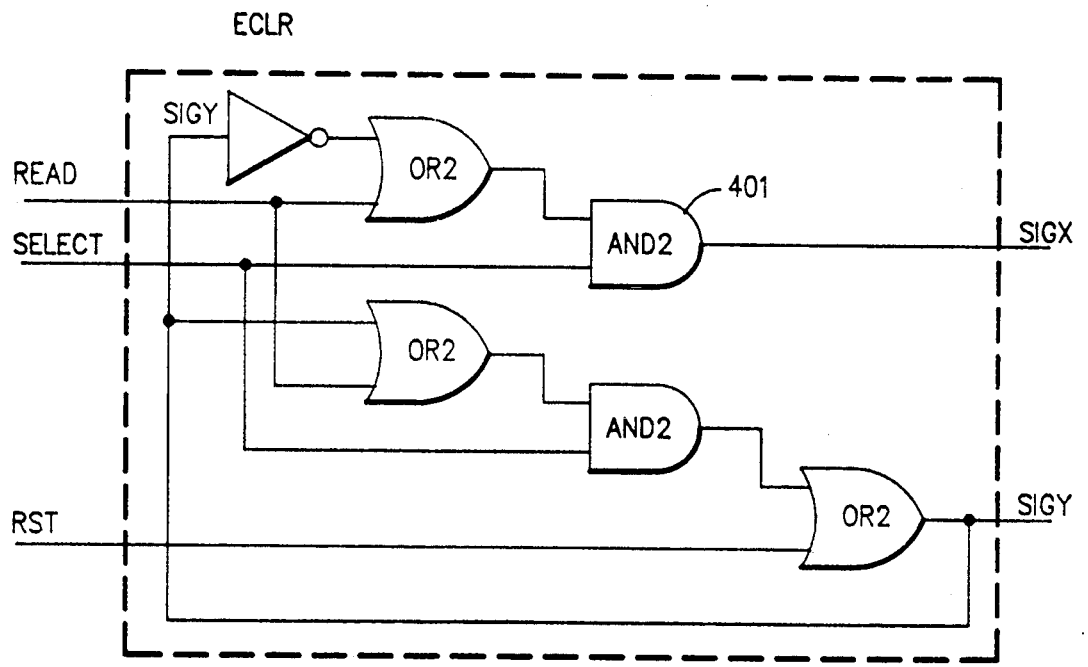
FIG. 4 is a logic diagram of the register clock generator in FIG. 2 generating the signals in FIG. 3.

FIG. 4 illustrates a Logic Diagram for implementing the equation. Signal SIGX is goes high in the presence of the SELECT signal at AND gate 401 without the presence of signal SIGY. SIGX remains high for the duration of the READ signal at AND gate 401. SIGX goes low when the READ signal is low at AND gate 401 and SIGY goes high. SIGY will go active on the READ signal being active and the SELECT signal going active and it will remain active until the SELECT signal goes inactive. SIGY can also be activated when the reset RST is made active from the processor.

Referring to FIG. 2 there is also illustrated the registers and the logic for the registers. In the example given there are for example eight registers in the register set and each receive the SIGX and SIGY generated control signals. Each register labeled EREG 202 captures data events occurring on input signal labeled EVENT and based on the states of the input signals SIGX and SIGY, either holds or resets the output signal OUT which is the current state of the circuit. The RST signal is from an external source such as the Supervisor that puts the circuits into a known state such as resets to all zeros. The sequence created by SIGX and SIGY corresponds to four phases as numbered in FIG. 3. During each phase the EREG circuit operates differently. Each EREG circuit 202 consists of two asynchronous registers TMP and OUT. TMP is a staging register, and an OUT is the register that is read by the reading device. Below are the equations used to create TMP and OUT.

TMP=EVENT+(TMP & #OUT &(SIGX+SIGY))

OUT=(TMP & #(SIGX+SIGY))+(OUT & (SIGX+#SIGY)) with the definitions stated above.

Figure 5:
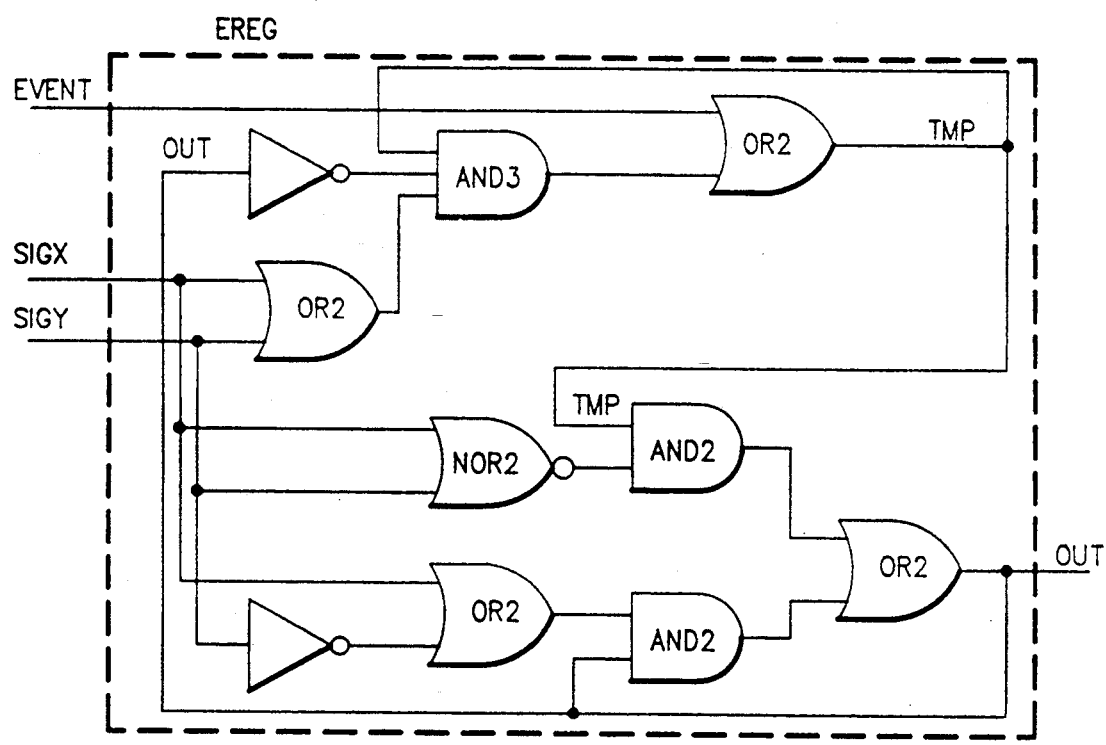
FIG. 5 is a logic diagram of the logic of the registers in FIG. 2.

Each register can implement the equation as represented by the logic diagram of FIG. 5. Referring to FIG. 5 the EREG 202 consists of two asynchronous feedback circuits which hold a state at points TMP and OUT. Staging point TMP functions as a staging register that captures occurrences on the input signal EVENT, and holds the state if EVENT occurred during the READ of the register. In detail, staging point TMP is activated by the occurrence of EVENT, and will remain active while read point OUT is not active and either SIGX or SIGY is active.

Read point OUT functions as a bus interface register. It is set by staging point TMP being active when it is not being read. When it is being read, its state will not change and at the end of the read cycle its state is cleared or deactivated. In detail, read point OUT is activated by staging point TMP being active whenever neither SIGX nor SIGY is active. Read point OUT will remain active until SIGX is not active at the same time SIGY is active.

The circuit described above will capture a data event and hold it for reading. When the circuit is read out it will be reset in such a way that the occurrence of a data event will not be missed and a single data event will not be captured for reading twice. Below is described the operation of the circuit when a data event occurs during the different phases of a read operation as labelled in FIG. 3.

If the event occurs during phase 1, OUT is set, then read out and reset during the current read sequence:
1. TMP is set by the EVENT in phase 1.
2. OUT is set by TMP in phase 1.
3. TMP is reset by OUT in phase 1.
4. OUT is reset in phase 4.

If the event occurs across phase 1 and phase 2, OUT is set, then read out and reset during the current read sequence:
1. TMP is set by EVENT in phase 1.
2. OUT is set by TMP in phase 1.
3. EVENT drops in phase 2.
4. TMP is reset by OUT in phase 2.
5. OUT is reset in phase 4.

If the event occurs in phase 2, then OUT is not set until after the current read sequence, and it is read out and reset during the next read sequence:
1. TMP is set by EVENT in phase 2.
2. OUT is set by TMP in the next phase 1.
3. TMP is reset by OUT in the next phase 1.

If the event occurs across phase 2 and phase 3, then OUT is not set until after the current read sequence and it is read out and reset during the next read sequence:
1. TMP is set by EVENT in phase 2.
2. EVENT drops in phase 3.
3. OUT is set by TMP in next phase 1.
4. TMP is reset by OUT in the next phase 1.

If the event occurs in phase 3, then OUT is not set until after the current read sequence and it is read out and reset during the next read sequence:
1. TMP is set by EVENT in phase 3.
2. OUT is set by TMP in the next phase 1.
3. TMP is reset by OUT in the next phase 1.

If the event occurs across phase 3 and phase 4, then OUT is not set until after the current read sequence and it is read out and reset during the next read sequence:
1. TMP is set by EVENT in phase 3.
2. EVENT drops in phase 4.
3. OUT is set by TMP in the next phase 1.
4. TMP is reset by OUT in the next phase 1.

If the event occurs in phase 4, then OUT is not set until after the current read sequence and it is read out and reset during the next read sequence:
1. TMP is set by EVENT in phase 4.
2. OUT is set by TMP in the next phase 1.
3. TMP is reset by OUT in the next phase 1.

If the event occurs across phase 4 and phase 1, then OUT is not set until after the current read sequence and it is read out and reset during the next read sequence:
1. TMP is set by EVENT in phase 4.
2. EVENT drops in the next phase 1.
3. OUT is set by TMP in the next phase 1.
4. TMP is reset by OUT in the next phase 1.

In each of the above scenarios, the occurrence of EVENT was either captured in OUT for read and reset during the current read sequence or it was temporarily captured in TMP, then OUT was set with it to be read and reset during the next read sequence.

There are no windows of time when EVENT can happen where TMP or OUT are not set by its occurrence. Thus, the occurrence of EVENT is always captured.

Assuming that the EVENT as captured by the circuit is not longer in duration than a read sequence, there are no windows of time when EVENT can happen where TMP and OUT will both capture its occurrence. Thus, a single occurrence of EVENT will not be presented twice. If an EVENT can be longer than a read sequence, then circuitry must be added to create a single pulse shorter than a read sequence when EVENT is activated.

In summary, the invention described will capture and hold data events in a register than can be read at any time and is reset when read. The reset of the register is accomplished by internal circuitry that detects the action of the read. There is no need for external circuitry or code to accomplish the reset of the register. The register reset is done in such a way that a data event on the register inputs will not be missed or registered twice regardless of the timing relationship between the reading of the register and the occurrence of the data event. The register is asynchronous, thus eliminating the need to implement synchronization registers in order to accomplish the register reset circuit.

While the invention has been particularly shown and described with reference to preferred embodiments thereof, it will be understood by those skilled in the art that various changes in form and details may be made therein without departing from the spirit and scope of the invention.

I claim:

1. In an event catching system including a read and reset register and a processor for reading said register and a data source providing data to the register representing an event where the processor sends register select signals, reset signals and read signals to said read and reset register, a method of simultaneous capture of event data and read out and reset of the read and reset register comprising the steps of:

generating independently of any event data or state of the read and reset register a first signal representing start of the select signal through termination of the read signal, generating independently of any event data or state of the read and reset register a second signal representing start of the read signal through termination of the select signal, and combining said first and second signals to provide four different states to control the function of the read and reset register to capture, in said read and reset register and provide to the processors, data from an event occurring before onset of the read signal including when in a first of said four different states making the data available for reading by the processor, when in a second of said four different states if a data event occurred previously in said first state holding it for reading by the processor and if a data event occurs during the second state holding it in a temporary location, when in a third of said four different states if a data event occurred previously in the first state no longer holding it for reading by the processor and if a data event occurs during the third state or if one had occurred during the second state then holding it in a temporary location, and when in a fourth of said four different states if the data event occurred in the first state not longer holding it for reading by the processor, if there is a data event that occurred in the fourth state or had occurred during the second or third state holding it in a temporary location, and if a data event occurs in the subsequent first state in second, third or fourth state making the occurrence available to be read by the processor and holding it in subsequent second and third states as though the event occurred during the subsequent first state.

2. In an event catching system including a read and reset register and a processor for reading said read and reset register and a data source providing data to the read and reset register representing an event where the processor sends register select signals, reset signals and read signals to said read and reset register, the improvement for capture of event data comprising in combination:

means for generating a first signal representing start of the select signal through termination of the read signal, said first signal being generated independently of the data provided to said read and reset register or the state of the read and reset register.

means for generating a second signal representing start of the read signal through termination of the select signal, said second signal being generated independently of data provided by said read and reset register or the state of the read and reset register; and means responsive to said first and second signals for combining said first and second signals for in a first state of said combined signals the event data is made available for reading by said processor, in second state of the combined signals if a data event occurred previously during the first state holding it for the reading by the processor and if a data event occurs during the second state holding it in temporary storage, in a third state of the combined signals if a data event occurred previously in the first state it will be held for reading by the processor and if a data event occurs during the third state or if one had occurred during the second state then it is held in a temporary location, and in a fourth state of the combined signals if the data event occurred in the first state it will no longer be held for reading by the processor, and if there is a data event that occurred in the fourth state or had occurred during the second or third state then it will be held in a temporary location, and in the subsequent first state if a data event occurred in the second, third or fourth states the occurrence of the event is made available to be read by the processor and be held in subsequent second and third states.

3. An improved register for capturing asynchronous data event signals from a data source and in response to register select and register read signals from a processor, providing them to the processor, said register comprising:

a) A first latch stage for retaining a first occurring data event signal for reading by the processor;

b) A second latch stage for retaining a second occurring data event signal occurring asynchronously from said first data event while said first latch stage retains the first occurring data event signal; and c) Logic means responsive to said register select and register read signals for:

i) blocking entry of such second data event signal into said first latch stage after selection of said register by said processor with said register select signal;

ii) retaining said any such second occurring data event in said second latch stage while at least one of said register select and read signals are provided by said processor; and iii) entering said such second occurring data event signal into the first latch stage for reading by said processor after the end of the provision of said register select and read signals by said processor, whereby neither the first or second occurring data event signals is lost or duplicated by the operation of said register in the providing of the first occurring data event signal to the processor.

4. A method for capturing and subsequently reading of asynchronously occurring data signals using a two stage read and reset register for capturing the asynchronously occurring data signals and a processor for reading data signals in said two stage read and reset register, where the processor provides a register select signal and a shorter read signal that occurs during the select signal, the method comprising:

a) providing, prior to the occurrence of either the read and reset signals, a first data signal to the first stage of the register for reading by said processor;

b) blocking entry into said first stage by any further data signal on occurrence and for duration of the select signal;

c) storing in a second stage of said register said any further data signal on onset of and for duration of the select signal;

d) providing for reading the first data signal during the read signal occurring some period of time after onset of select signal and lasting until some period of time before termination of the select signal; and e) transferring said any further data signal from the second stage to the first stage on termination of the select signal whereby neither the first data signal or the any further data signal is lost or duplicated.

5. The method of claim 4 including the steps of:

f) generating a first signal representing start of the select signal through termination of the read signal;

g) generating a second signal representing start of the read signal through termination of the select signal; and h) using the first and second control signals to provide four different generating states to cause the register to function as set forth in steps a) to e) in alphabetical sequence.

* * * * *